United States Patent [19]

Hansen

[11] Patent Number: 4,492,962

[45] Date of Patent: Jan. 8, 1985

[54] TRANSMITTING ADAPTIVE ARRAY ANTENNA

[76] Inventor: Peder M. Hansen, 655 Savoy St., San Diego, Calif. 92106

[21] Appl. No.: 297,598

[22] Filed: Aug. 31, 1981

[51] Int. Cl.³ .................................... G01S 5/02

[52] U.S. Cl. .................................... 343/369

[58] Field of Search ............... 343/373, 375, 368, 369, 343/395, 463, 433, 7 AG, 351, 360; 455/9, 10, 52, 69, 72, 138, 249, 393

[56] References Cited

U.S. PATENT DOCUMENTS

| | | | |
|---|---|---|---|
| 3,390,335 | 6/1968 | Miyagi | 455/52 |
| 3,518,585 | 6/1970 | Wilcox | 455/249 |
| 3,631,344 | 12/1971 | Greenwald | 455/138 |
| 3,879,733 | 4/1975 | Hansen et al. | 343/360 |
| 4,041,496 | 8/1977 | Norris | 343/368 |
| 4,117,494 | 9/1978 | Frazita | 343/368 |
| 4,220,954 | 9/1980 | Marchand | 343/433 |
| 4,316,159 | 2/1982 | Ho | 333/104 |
| 4,348,676 | 9/1982 | Tom | 343/369 |

*Primary Examiner*—Theodore M. Blum
*Assistant Examiner*—Brian Steinberger
*Attorney, Agent, or Firm*—Robert F. Beers; Ervin F. Johnston; Edmund W. Rusche, Jr.

[57] ABSTRACT

A low-power adaptive array for transmitting a signal may be used by itself in low-power applications or in high-power applications in conjunction with a commercial radio transmitter to optimize the radiation field of the transmitter used. The adaptive system comprises a continuous-wave (C-W) signal source having a certain amount of power. A power divider hybrid circuit, whose input is connected to the output of the C-W generator, divides its output power into N+1 parts. N quadrature hybrid circuits, one in each of N channels, whose inputs are connected to the output of the power divider hybrid circuit, divide their input signals into two quadrature components. One channel, a reference channel, does not require a quadrature circuit. A plurality of attenuators, each having inputs from the power divider hybrid circuit and the quadrature hybrid circuits, attenuates the power received from the quadrature hybrid circuit. A summer, having two inputs which are connected to the two outputs of its respective attenuator, sums its input signals. A linear amplifier, whose input is connected to the output of the summer, amplifies its input signal. An impedance matching network receives the signal from the linear amplifier and matches it to the input to an antenna. A plurality of monitors, distributed at various strategic locations within the environment, receives and monitors the phase and amplitude of the transmitted signal at the several locations. An antenna current monitor collects the currents from all the monitors, and transmits them by telemetry to a monitoring circuit, which transmits them directly to a microprocessor. The microprocessor, whose input is connected to the receiver of the monitored signals and whose output is connected to the inputs of the attenuators, processes the monitored signals and sends signals to the attenuator, to cause the attenuator to be adapted, that is, adjusted, in a manner to optimize a desired parameter, for example maximum power in a given direction.

2 Claims, 5 Drawing Figures

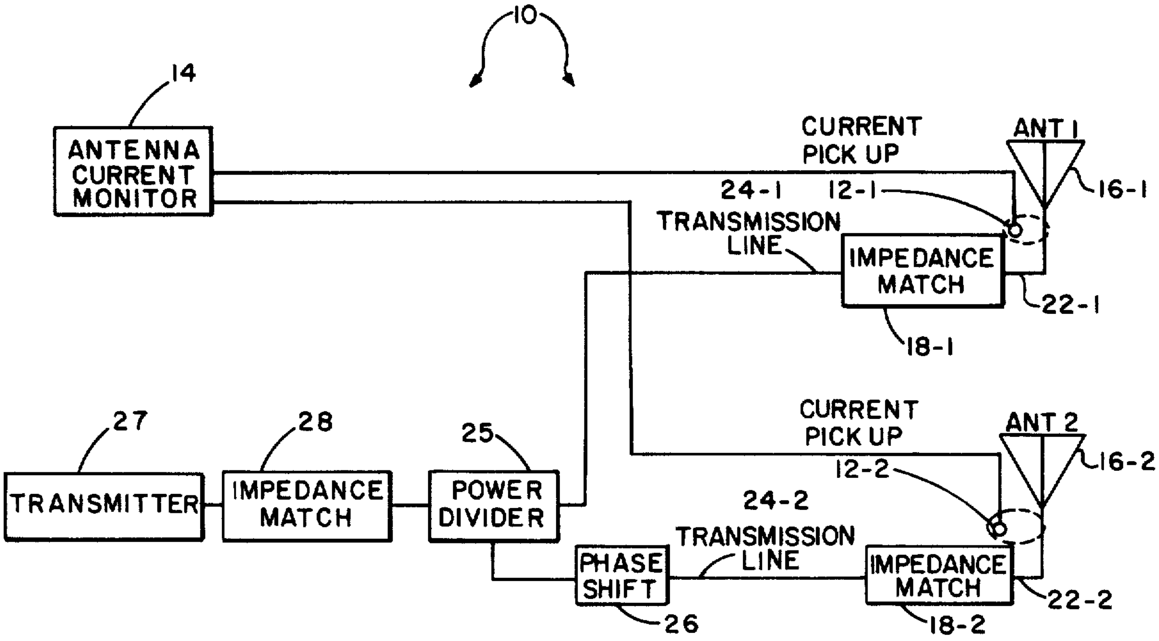
FIG. 1. TWO-ELEMENT ARRAY (PRIOR ART).
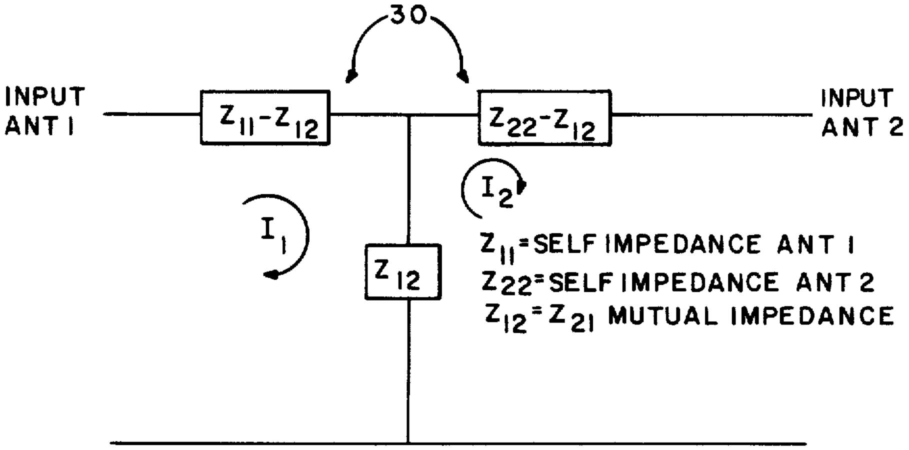
FIG. 2. TWO-ELEMENT ARRAY TEE NETWORK REPRESENTATION.

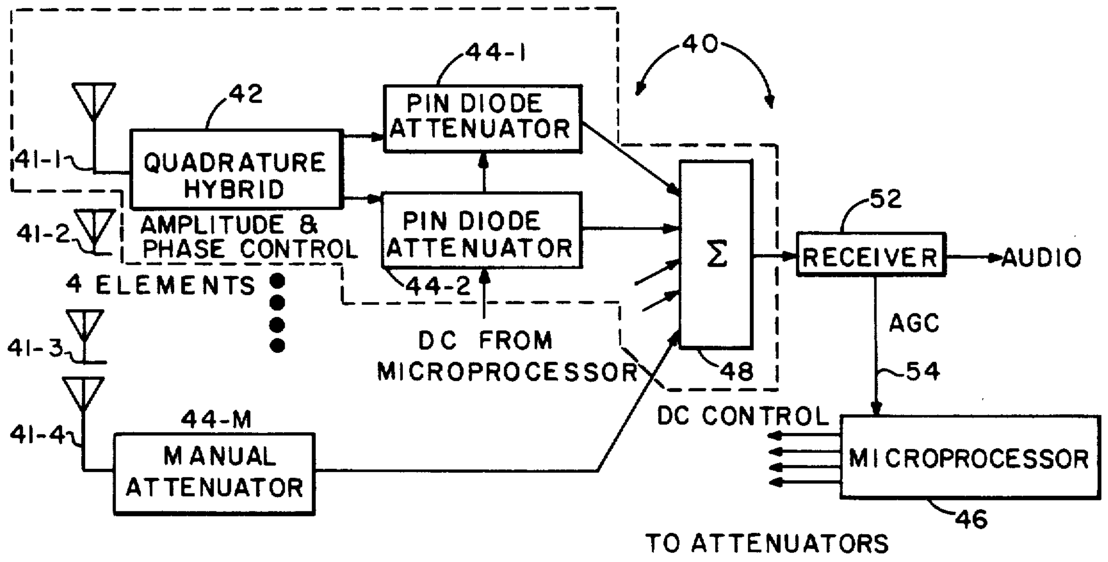
FIG. 3. DIGITAL RECEIVING ARRAY.
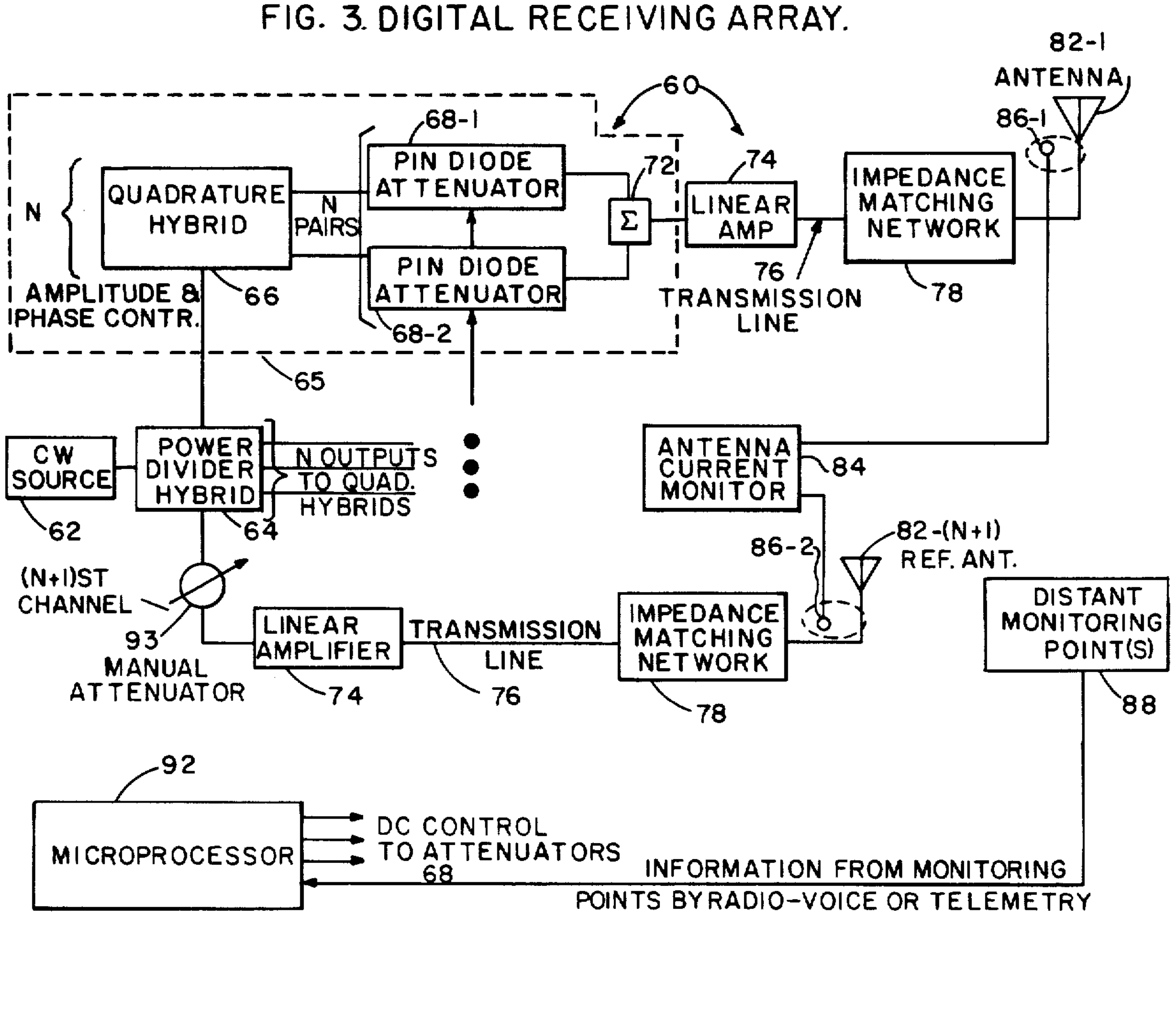
FIG. 4. TRANSMITTING ADAPTIVE ARRAY

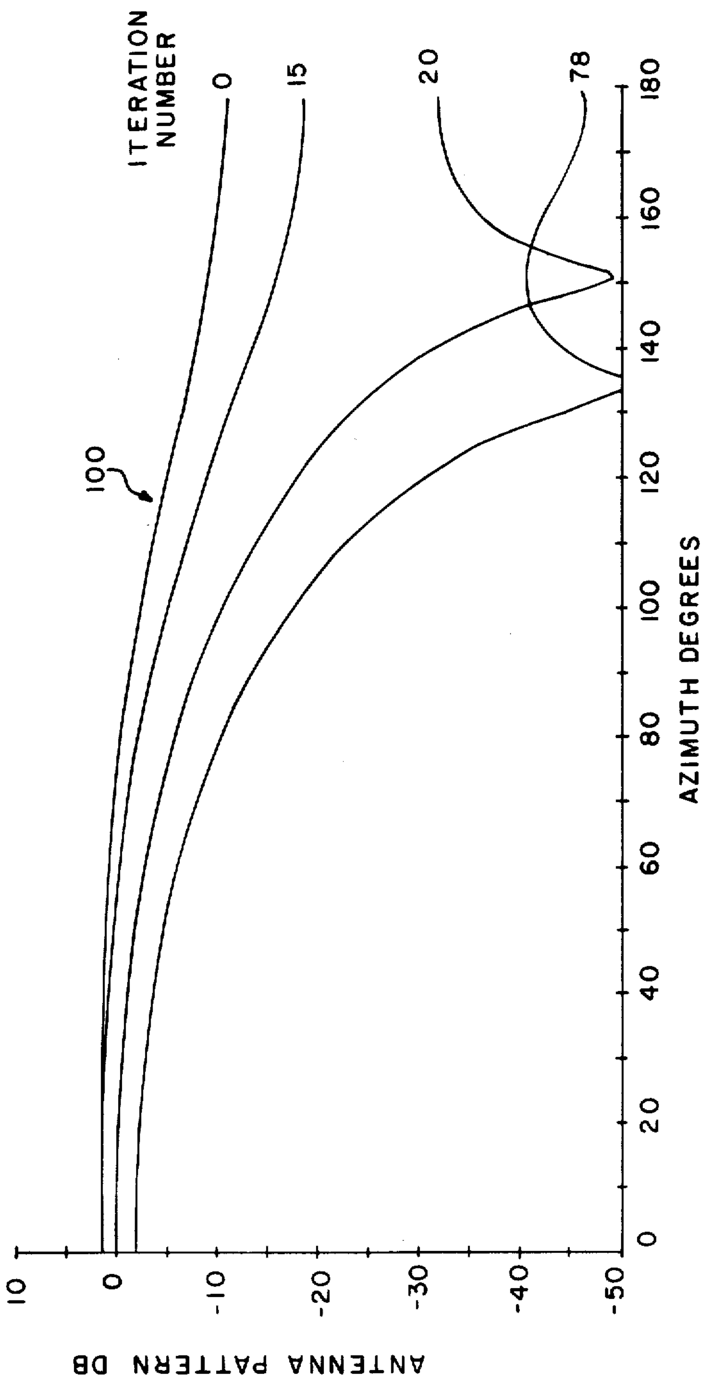
| ITERATION NUMBER | WEIGHTS (AMP, PHASE DEG) W1 | W2 (REF) | W3 |
|---|---|---|---|
| 0 | 0.50,-60.0 | 1.00,0.0 | 0.50,60.0 |
| 15 | 0.54,-79.7 | 1.00, 0.0 | 0.50, 79.7 |
| 20 | 0.55,-105.0 | 1.00, 0.0 | 0.53, 105.0 |
| 78 | 0.52,-127.5 | 1.00, 0.0 | 0.49,127.5 |
NOTES: 3 ELEMENTS IN LINE ARRAY
60-DEGREE SPACING
NULLS REQUIRED AT 135° AND 180°
FIG. 5. RANDOM SEARCH TRANSMITTING ARRAY RESPONSE

TRANSMITTING ADAPTIVE ARRAY ANTENNA

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention described herein relates to a transmitting adaptive array system which provides automatic adjustment of the amplitude and phase of individual elements of a transmitting antenna array in order to optimize the array antenna pattern with respect to some parameter. One application of this system is adjustment of broadcast array antennas, another application is to portable transmitting systems for frequencies from ULF to HF for providing emergency communications for military applications.

More than twenty-five percent of the AM broadcast antenna systems in the USA are directional arrays. The primary purpose of a directional array is to steer nulls in the direction of other transmitters sharing the same frequency in order to minimize interference between the two transmitters. In some cases, the array may also be used to provide signal enhancement in one or more directions.

Further background information is provided hereinbelow when FIGS. 1-3 are discussed.

SUMMARY OF THE INVENTION

The adaptive system for transmitting a signal comprises a local-power transmitter which generates a continuous-wave (C-W) signal. This signal is split by a power divider circuit into two or more parts depending upon how many antenna elements are used. Each part of the signal is then given amplitude and phase control, typically by using quadrature hybrid-attenuator and summer circuits. Each part of the signal with individually controlled amplitude and phase is then connected to one antenna element.

Linear amplifiers may be provided after the amplitude and phase control circuit, in order to provide enough power for accurate readings of antenna current and field strength.

Critical monitoring points are selected in the direction of required antenna pattern nulls and/or in the directions of desired antenna pattern maximums. At each monitoring point, a signal strength measurement device is placed and a method for relaying this information to a microprocessor located at the transmitter site is required (either voice or telemetry).

The microprocessor, using the information from the monitoring points, adapts to provide optimum performance using a random search approach. Since the information from each monitoring point is separate, the random search algorithm can be required to either minimize or maximize the signal at each individual monitoring point depending upon whether a null or maximum is desired in that direction, that is, the direction from the transmitting antenna array to the monitoring point.

The number of iterations required will depend upon the number of array elements in the antenna, the number of monitoring points, and the starting point of the search. Using theoretical calculations, a reasonably close starting point is chosen and convergence is generally quite rapid, certainly less than 100 iterations. If voice relay from the monitoring points and manual entry are used, the total time for initial convergence should be less than one hour, and if a telemetry system were used, the whole process requires only a few minutes at most.

OBJECTS OF THE INVENTION

An object of the invention is to provide a transmitting adaptive array antenna in which the phase and amplitude of each element of the array can be so adjusted as to provide either a null or a maximum in the desired directions.

Another object of the invention is to provide such an antenna wherein a random search algorithm is used.

These and other objects, advantages and novel features of the invention will become apparent from the following detailed description of the invention when considered in conjunction with the accompanying drawings.

BRIEF DESCRIPTION OF THE DRAWINGS

FIG. 1 is a block diagram of a prior art two-element antenna array.

FIG. 2 is a block diagram of a tee network representation of the two-element antenna array of FIG. 1.

FIG. 3 is a block diagram of a digital receiving array.

FIG. 4 is a block diagram of the transmitting adaptive array antenna of this invention.

FIG. 5 is a set of graphs showing the transmitting array response to a random search, with iteration number as the parameter.

DESCRIPTION OF THE PREFERRED EMBODIMENTS

Directional broadcast arrays require a special feed network consisting of a power divider, phase shifters, and impedance matching networks.

A block diagram for a typical two-element array 10 is given in FIG. 1. Detailed information on "Standard Broadcast Antenna Systems" is given by Smith, C. E., and D. B. Hutton in Chapter 3 of NAB Engineering Handbook, 1960, Edition 5, McGraw Hill, New York, N.Y. The current pickup loops, 12-1 and 12-2, and the antenna current monitor 14 are used to determine the amplitude and phase of the currents in each antenna element, 16-1 and 16-2. In general, in a phased array the output impedance of each antenna element, 16-1 and 16-2, is affected by each of the other elements through their mutual impedance.

The two-element array 10, of FIG. 1, can be represented by a tee network 30 as shown in FIG. 2. The interaction can be accounted for by Eqs. (1) and (2) if the impedances and current ratio are known.

$$Z_1 = Z_{11} + Z_{12} I_2 / I_1 \quad (1)$$

$$Z_2 = Z_{22} + Z_{21} I_1 / I_2 \quad (2)$$

The usual procedure for adjusting a broadcast array 10 consists of the following:

(1) The antenna system self and mutual impedances, $Z_{11}$, $Z_{22}$ and $Z_{12}$, $Z_{21}$, FIG. 2, are determined by theoretical means, and/or measurement.

(2) The final input impedance, $Z_1$ or $Z_2$, of each element, 16-1 or 16-2, FIG. 1, is estimated, using Eqs. (1) and (2), where $I_1/I_2$ is determined from the theoretical array 10 design. Of course these impedances are not realized until the array 10 is finally adjusted to provide the correct current ratio.

(3) The antenna impedance matching networks, 18-1 and 18-2, are isolated and adjusted to match the estimated impedance to the feed line, 22-1 and 22-2 (usually 52-ohm coaxial cable). Typically this is done by the expedient of making up a network with the same impedance as the estimate, and connecting it in place of the antenna 16-1 or 16-2. The matching network, 18-1 or 18-2, is then adjusted, using a bridge to provide the correct match to the transmission line, 24-1 or 24-2. The matching network, 18-1 or 18-2, is then reconnected to the antenna, 16-1 or 16-2.

(4) The power division and phase shift networks, 25 and 26, are preset on the basis of the initial design. Transmitter 27 is turned on and readjustments made to give the correct amplitude and phase for the antenna currents, based on the design calculations.

This concludes the preliminary adjustment of the conventional, nonadaptive, antenna. At this point, field strength measurements would be made, and if the theoretical calculations were exact, the measured field strength would be so close to theoretical that no further adjustments would be required.

Unfortunately, the exact pattern determined by theory is never realized because there are many variables that cannot be accounted for accurately. For example, there is no exact theory to account for the effects on antenna impedance of the ground parameters, and the ground parameters vary with moisture content. Also, reradiation or reflection from nearby objects such as power lines or other broadcast towers can distort the pattern, especially in the nulls. Consequently, final adjustments must be made to bring the pattern reasonably close to the requirements.

The radiation pattern depends on both impedance and the currents of antenna elements, 16-1 and 16-2, FIG. 1. Consequently, the adjustments are interactive. This, coupled with the fact that field strength measurements must be taken each time a pattern adjustment is made makes the final adjustment tedious, time consuming, and expensive. It can often take weeks and has been known to take months.

In sharp contrast, receiving adaptive array antennas have electronic control of amplitude and phase of each element. An adaptive control algorithm adjusts these controls in order to optimize the resultant pattern in a predetermined manner. Usually maximum received signal-to-noise ratio is sought. The array achieves this by nulling interfering signals and by forming a beam on the desired signal. In an environment where much interference is present, the improvement obtained by this technique can be dramatic.

Perhaps the most popular approach to building receiving adaptive array processors is to use the least-mean-square (LMS) algorithm, after Widrow. Widrow, B. et al describe "Adaptive Antenna Systems" in Proc. IEEE, 55 12, December 1967, pp 2143–2159. In a configuration using the LMS algorithm, the array output is used for a coherent error signal to be correlated with each input. The algorithm converges when zero correlation to each input is reached.

For a transmitting array, of the type described herein, no single coherent error signal is available. Consequently, the LMS algorithm is not applicable. Fortunately, some work has been done on adaptive array algorithms that do not require a coherent error signal. These types of algorithms use an incoherent measure of performance. This type of algorithm is described by Widrow, B. et al in an article entitled "A Comparison of Adaptive Algorithms Based on Methods of Steepest Descent and Random Search", which appeared in the IEEE Trans. Antennas Propagation, AP-24, No. 5, September 1976, pp 615–637.

An example of this type of array, used for receiving, has been constructed and tested in the laboratory. Full details are given by Hansen, P. M. et al in report TN-354, dated Jan. 26, 1978, and entitled "Antenna Array for HF Communications Enhancement" published by the Naval Ocean Systems Center, San Diego, Calif. 92152.

A block diagram of a receiving array 40 is given in FIG. 3. The quadrature hybrids 42 divide the signal from each element 41-1 and 41-2, into in-phase and quadrature components. The pin diode attenuators, 44-1 and 44-2, are controlled by a d-c current from microprocessor 46, and give 180-degrees phase shift to the RF signal when negative control current is applied. Thus, in effect, any amplitude and phase can be obtained for the signal from each antenna. The signals are summed, in summer 48, using hybrids, and connected to the single receiver 52. A signal from the receiver 52, on line 54, is used by the microprocessor 46 as an error signal. In this case, the AGC voltage of the receiver 52 is used. The microprocessor 46 adapts to adjust this error signal for optimal performance with respect to some chosen parameter. For example, to null signals the array searches for an AGC signal minimum and for beam steering an AGC signal maximum is sought.

A single random search routine is used. The microprocessor 46 perturbs randomly the weights of the pin diode attenuators, 44-1, 44-2, and others, not shown, about the last best value until a better value is found. The number of iterations required depends on the details of the random search technique, number of antenna 41 elements, number of nulls required and the starting point. In the laboratory, it was found that a single null could be steered to better than 40 dB in an average of twenty-five iterations.

For the nulling algorithm, it was required that one channel be fixed so that the array 40 would not turn all weights to zero. Thus the last antenna element 41-4 was provided with a fixed attenuator 44-M, which is not controlled by the microprocessor 46.

For beam forming, the adaptation criterion was reversed and again one channel weight was fixed, however only phase shift was allowed on the other channels. Convergence for beam steering was considerably faster than for nulling, requiring an average of only ten iterations. The actual time required for convergence depends upon the time per iteration, which consists primarily of receiver 52 settling time, because after each weight perturbation the processor 46 must wait until the receiver 52 has settled.

Referring now to FIG. 4, therein is shown an adaptive system 60 for transmitting a signal, comprising means 62 for generating a continuous-wave (C-W) signal, having a predetermined amount of power. Means 64, having N+1 outputs, whose input is connected to the output of the generating means 62 divides the power of the signal received at its input between the N+1 outputs. A plurality of N means 66, whose inputs are connected to the output of the power dividing means 64, each divide their input signal into two quadrature components.

A plurality of 2N attenuating means 68, each having an input from one of the N quadrature signal dividing means 66, attenuate the power received from the quadrature dividing means. A plurality of means for summing 72, each having 2 inputs which are connected to the 2 outputs of the means 68 for attenuating, sums its input signals.

For each channel, means 74, whose input is connected to the output of the summing means 72, amplifies its input signal in a linear manner. Means 78, whose input is connected to the output of the linear amplifying means 74, matches the impedance at its input to the impedance of its output. Means 82, whose input is connected to the output of the impedance matching means 78, transmits the generated signal into the surrounding environment.

A plurality of N+1 antenna current monitoring means 86, each means being associated with a corresponding antenna 82, receive and monitor signals proportional to antenna current. Means 84 are provided for receiving and displaying the phase and amplitude of the antenna current signals.

One or more field strength monitors 88, distributed at various locations within the environment, receive, monitor and retransmit the amplitude of the transmitted signal at the several locations. Critical monitoring points are selected in the direction of required nulls and/or in the directions of desired coverage. At each monitoring point a signal strength measurement device is placed and a means 88 for relaying this information back to a microprocessor 92 is required (either voice or telemetry).

Means 88 retransmits the information about received signal amplitude back to a microprocessor 92.

Means 92, generally a microprocessor, whose input is connected to the retransmitting means 88 and whose outputs are connected to inputs of the means for attenuating 68, processes the monitored signals. The microprocessor using information from the monitoring points adapts to provide optimum performance using the random search approach. Since the information from each monitoring point is separate, the algorithm can be required to either minimize or maximize the signal at each individual monitoring point depending upon whether a null or maximum is desired in that direction.

The number of iterations required will depend upon the number of array elements, number of monitoring points, and starting point. Using the theoretical calculations a reasonably close starting point would be chosen and convergence should be quite rapid, certainly less than 100 iterations. If voice relay from the monitoring points and manual entry were used, the total time for initial convergence should be less than an hour, and if a telemetry system were used the whole process would only require a few minutes at most. Depending on the results of the processing, the microprocessor 92 sends d-c control signals to the means for attenuating 68, to cause the attenuating means to be adapted, that is, adjusted, in a manner to optimize a desired parameter, for example, maximum power in a given direction. An example done by computer simulation of a three element in-line array required to null at 135 degrees, and 180 degrees is given in FIG. 5. The elements are uniformly spaced at 60 degrees. Four patterns and the corresponding weights given are shown for various times during the adaption process. Note that even though the starting point was not particularly close to the final value only 78 iterations were required for excellent convergence.

As shown in FIG. 4, the means for attenuating 68 comprises 2N pin diode attenuators.

The quadrature hybrid 66, pin diode attenuators, 68-1 and 68-2, and the summer 72 constitute a means 65 for providing amplitude and phase control of the generated signal and could be replaced by any other means that provides this function.

As previously described, one channel need not be controlled, and hence the last channel in FIG. 4 is provided with means 93 for fixed attenuation instead of a means for variable amplitude and phase control. The other components of this channel are the same as previously described.

A description of how the adaptive array 60 of FIG. 4 can be used with the standard two-element array 10 of FIG. 1 follows.

The antenna current monitoring system, 12 and 14, is standard on medium frequency (MF) broadcast arrays 10. The purpose is to provide a method for adjusting the power divider 25 and phase shifter 26 circuits.

The usefulness of a transmitting adaptive array for adjusting an MF broadcast array is as follows:

(1) the high power divider 25 and phase shift circuits 26 of the standard broadcast array 10 would be temporarily replaced by a low power transmitting adaptive array 60 of FIG. 4, (2) the monitor systems 88 would be placed at appropriate positions, (3) the adaptive array 60 would be allowed to adapt giving the optimum adjustment, (4) the relative amplitude and phase of the optimum antenna currents would be read off the antenna current monitoring system 84 and 86, (5) the high power divider 25 and phase shifter 26 circuits would be hooked up, (6) the power divider 25 and phase shifter 26 would be adjusted to obtain the optimum amplitude and phase of the antenna currents as measured in step 4.

For a general transmitting adaptive array for use in communications the antenna current monitoring system, 84 and 86, is not needed.

For military and other applications where the power requirements are much less than for commercial applications, and where the environment can cause completely different radiation patterns in different locations, the embodiment 60, shown in FIG. 4, would be used on a permanent basis.

Obviously many modifications and variations of the present invention are possible in the light of the above teachings. It is therefore to be understood that within the scope of the appended claims the invention may be practiced otherwise than as specifically described.

What is claimed is:

1. An adaptive array system comprising N+1 channels for transmitting a signal, where N is some positive integer, comprising:

means for generating a continuous-wave (C-W) signal, having a predetermined amount of power;

means having N+1 outputs, whose input is connected to the output of the generating means, for dividing the power of the signal received at its input between the N+1 outputs;

a plurality of N means, whose signal inputs are connected to N of the outputs of the power dividing means, for controlling amplitude and phase for each of the N channels, said controlling means also having inputs for receiving d-c control signals;

means whose input is connected to an output of the power dividing means for providing a reference phase and amplitude for the adaptive system;

a plurality of N+1 means, whose inputs are connected to the outputs of the amplitude and phase control means and of the reference means, for linearly amplifying its input signal;

a plurality of N+1 means, whose inputs are connected to the output of the linear amplifying means, for matching the impedance at their inputs to the impedance at their outputs;

means, whose input is connected to the output of the impedance matching means, for transmitting the generated signal into the environment;

at least one monitoring means, distributed at various locations or sites, within the environment, for receiving, monitoring, and retransmitting the amplitude of the transmitted signal at the several locations; and means, disposed to receive the amplitude of the retransmitted signal from the monitoring means, for processing the amplitude of the retransmitted signal according to a preselected optimization algorithm, said processing means outputs connected to the inputs for receiving d-c control signals of the d-c controlling means whereby control signals are relayed to cause the controlling means to readjust phase and amplitude levels for each of the N channels.

2. The adaptive system according to claim 1, wherein each amplitude and phase control means comprises:

means, whose input is connected to the output of the splitting means, for dividing its input signal into two quadrature components;

attenuating means, having inputs from the processing means and from the quadrature splitting means, for attenuating the power received from the quadrature splitting means; and means for summing, having inputs which are connected to the outputs of the means for attenuating, for summing its input signals.

* * * * *